(12) United States Patent
Cornelissen et al.

(10) Patent No.: US 10,649,167 B2
(45) Date of Patent: May 12, 2020

(54) FIBER MANAGEMENT TRAY WITH TWO-SIDED STORAGE POCKET

(71) Applicant: CommScope Connectivity Belgium BVBA, Kessel-Lo (BE)

(72) Inventors: Kurt Cornelissen, Hulshout (BE); Erwin Beckers, Werchter (BE); Robert Vanhentenrijk, Winksele (BE); Conny Van de Velde, Herselt (BE); Daniel Francois Daems, S-Gravenwezel (BE)

(73) Assignee: CommScope Connectivity Belgium BVBA, Kessel-Lo (BE)

( * ) Notice: Subject to any disclaimer, the term of this patent is extended or adjusted under 35 U.S.C. 154(b) by 52 days.

(21) Appl. No.: 15/531,080

(22) PCT Filed: Nov. 26, 2015

(86) PCT No.: PCT/EP2015/077772
§ 371 (c)(1),
(2) Date: May 26, 2017

(87) PCT Pub. No.: WO2016/083505
PCT Pub. Date: Jun. 2, 2016

(65) Prior Publication Data
US 2017/0363831 A1    Dec. 21, 2017

Related U.S. Application Data

(60) Provisional application No. 62/084,926, filed on Nov. 26, 2014.

(51) Int. Cl.
*G02B 6/36* (2006.01)
*G02B 6/00* (2006.01)
(Continued)

(52) U.S. Cl.
CPC ......... *G02B 6/4454* (2013.01); *G02B 6/3897* (2013.01); *G02B 6/4446* (2013.01);
(Continued)

(58) Field of Classification Search
CPC .. G02B 6/3897; G02B 6/4452; G02B 6/4455; G02B 6/4457; G02B 6/4446; G02B 6/4453
(Continued)

(56) References Cited

U.S. PATENT DOCUMENTS 5,402,515 A    3/1995  Vidacovich et al.
5,946,440 A *  8/1999  Puetz ................... G02B 6/4455
                                                        385/135
(Continued)

OTHER PUBLICATIONS

International Search Report and Written Opinion of the International Searching Authority for corresponding International Patent Application No. PCT/EP2015/077772 dated Jan. 16, 2016, 10 pgs.

*Primary Examiner* — Kaveh C Kianni
*Assistant Examiner* — Hung Q Lam
(74) *Attorney, Agent, or Firm* — Merchant & Gould P.C.

(57) ABSTRACT

A fiber management tray (10) is disclosed. The fiber management tray (10) can have a body (12) including a bottom wall (14) with side walls (16) extending outwardly from the bottom wall (14). The fiber management tray (10) can include a termination region (18) that has a first side (24) and a second side (26). The termination region (18) includes a termination panel (13) that holds connectors (20). The fiber management tray (10) can include a hinge area (56) for mounting said tray (10) to a tray tower (58) and a storage basket (32) located between the termination region (18) and the hinge area (56). The storage basket (32) can include a first pocket (44) that communicates with the second side (26) of the termination region (18) and an opposite second pocket (48) that communicates with the first side (24) of the
(Continued)

termination region (18). The fiber management tray (10) can define at least one fiber routing path on each of the first and second pockets (44, 48) of the storage basket (32). The fiber management tray (10) can define a fiber transition opening (54) for transitioning optical fibers between the second pocket (48) of the storage basket (32) and first side (24) of the termination region (18). The fiber transition opening (54) can have an access structure for allowing optical fibers to be inserted into the fiber transition opening (54).

17 Claims, 15 Drawing Sheets

(51) Int. Cl.
    *G02B 6/44*          (2006.01)
    *G02B 6/38*          (2006.01)
(52) U.S. Cl.
    CPC ......... *G02B 6/4453* (2013.01); *G02B 6/4457* (2013.01); *G02B 6/4471* (2013.01)

(58) Field of Classification Search
    USPC .............................. 385/53, 76–77, 134–137
    See application file for complete search history.

(56) References Cited

U.S. PATENT DOCUMENTS

| | | | |
|---|---|---|---|
| 8,467,651 B2 * | 6/2013 | Cao | G02B 6/445 385/135 |
| 2004/0175090 A1 | 9/2004 | Vastmans et al. | |
| 2008/0131069 A1 * | 6/2008 | Kowalczyk | G02B 6/4444 385/135 |
| 2009/0103879 A1 | 4/2009 | Tang et al. | |
| 2009/0257726 A1 | 10/2009 | Redmann et al. | |
| 2010/0054684 A1 * | 3/2010 | Cooke | G02B 6/4452 385/135 |
| 2011/0052133 A1 | 3/2011 | Simmons et al. | |
| 2011/0164853 A1 | 7/2011 | Corbille et al. | |
| 2014/0355945 A1 * | 12/2014 | Nieves | G02B 6/4446 385/135 |

\* cited by examiner

FIBER MANAGEMENT TRAY WITH TWO-SIDED STORAGE POCKET

CROSS-REFERENCE TO RELATED APPLICATION

This application is a National Stage Application of PCT/EP2015/077772, filed on Nov. 26, 2015, which claims the benefit of U.S. Patent Application Ser. No. 62/084,926, filed on Nov. 26, 2014, the disclosures of which are incorporated herein by reference in their entireties. To the extent appropriate, a claim of priority is made to each of the above disclosed applications.

TECHNICAL FIELD

The present disclosure relates generally to fiber optic systems and trays. More particularly, the present disclosure relates to trays and systems for mounting optical fiber and optic components to fiber management trays or other structures.

BACKGROUND

Optical fiber distribution systems may include equipment such as fiber management trays that are mounted in telecommunications closures or at other locations. A typical fiber management tray includes fiber routing paths for allowing excess length of optical fiber to be stored in looped configurations without violating minimum bend radius requirements for the optical fiber. Fiber optic components such as fiber optic fusion splice holders, passive optical splitters and wavelength division multiplexers are also often mounted to fiber management trays. Improvements in management trays are needed to accommodate more storage area for handling optical fiber and re-patching or adding pigtails.

SUMMARY

Teachings of the present disclosure relate to a fiber management tray. The fiber management tray can have a body including a bottom wall with side walls extending outwardly from the bottom wall. The fiber management tray can include a termination region that has a first side and a second side. The termination region includes a termination panel that holds connectors. The fiber management tray can include a hinge area for mounting said tray to a tray tower and a storage basket located between the termination region and the hinge area. The storage basket can include a first pocket that communicates with a second side of the termination region and an opposite second pocket that communicates with a first side of the termination region. The fiber management tray can define at least one fiber routing path on each of the first and second pockets of the storage basket. The fiber management tray can define a fiber transition opening for transitioning optical fibers between the second pocket of the storage basket and the first side of the termination region. The fiber transition opening can have an access structure for allowing optical fibers to be inserted into the fiber transition opening.

A variety of additional aspects will be set forth in the description that follows. The aspects relate to individual features and to combinations of features. It is to be understood that both the foregoing general description and the following detailed description are exemplary and explanatory only and are not restrictive of the broad inventive concepts upon which the embodiments disclosed herein are based.

DETAILED DESCRIPTION

Figure 1:
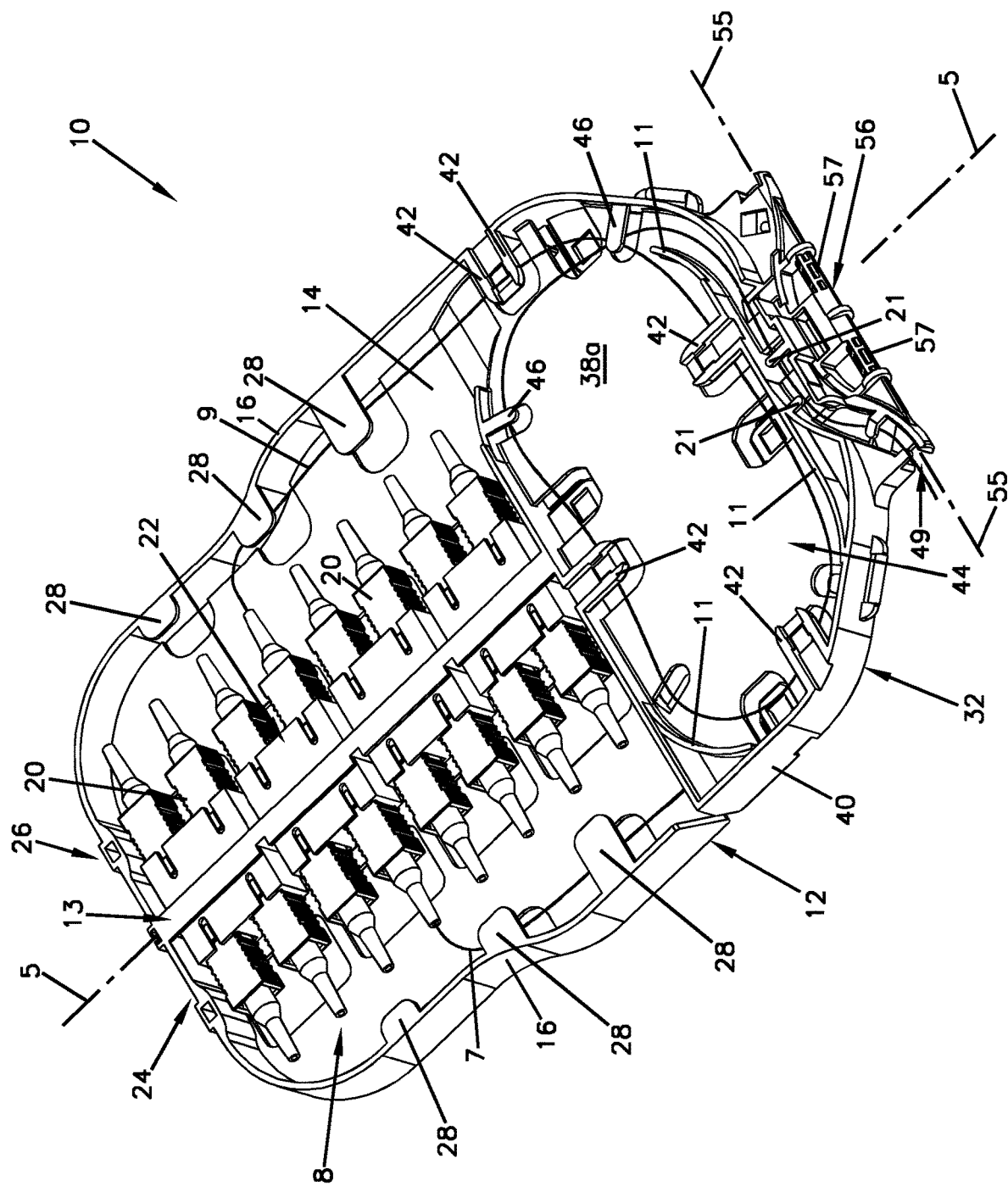
FIG. 1 is a top perspective view of a fiber management tray including a termination region and storage basket in accordance with the principles of the present disclosure.
Figure 3:
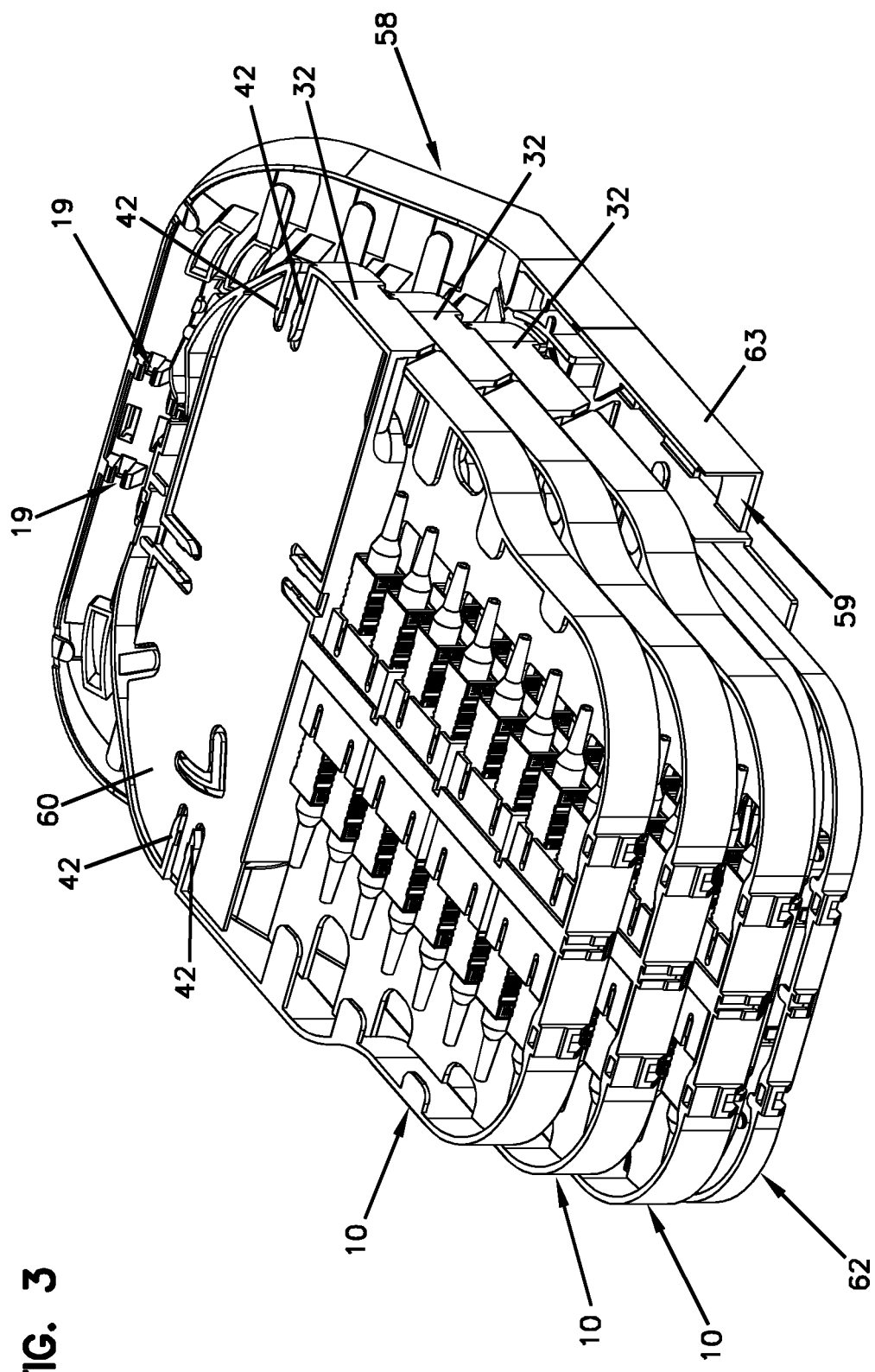
FIG. 3 is a perspective view including a plurality of trays of FIG. 1 with a cover.

FIG. 1 illustrates a front view of an example fiber management tray 10 (e.g., patch tray). In this example, one tray is depicted. It will be appreciated that multiple trays may be used and stacked in groups or blocks which form a stacked arrangement as shown in FIG. 3. The tray 10 includes a body 12, a flat bottom wall 14, and opposing side walls 16 extending outwardly therefrom. The tray 10 includes a tray axis 5 and a termination region 18 that extends along the tray axis 5. The termination region 18 can define one or more of fiber terminations, fiber splitters, fiber splices, or other fiber components. Various structures can be provided in the termination region 18 including splices and/or storage of cables. Various additional structures can be provided for managing and organizing the fiber optic cables, including a divider wall and cable retention tabs.

The termination region 18 includes a termination panel 13 that holds connectors 20 which are used to align connectors for transmission of fiber optic signals. In one example, the termination panel 13 can hold connectors 20 which allow for interconnection of two connectorized ends of cables. The termination panel 13 can include one or more integrally formed adapter blocks 22. In the depicted example, the adapter blocks 22 include four adapters that are each duplex adapters. In other examples, the adapter blocks 22 can include single adapters. The adapter blocks 22 interconnect two fiber optic connectors.

Figure 5:
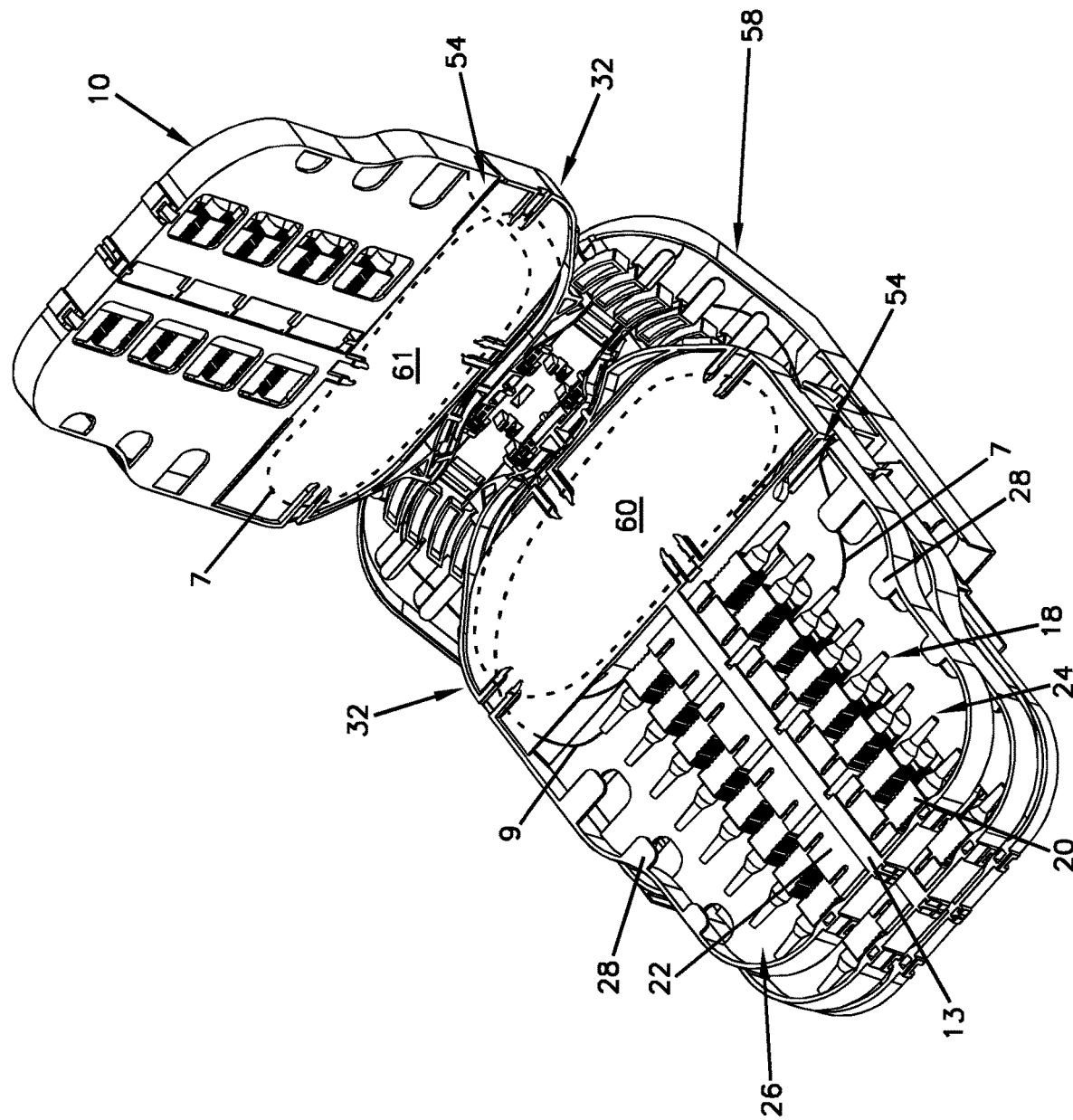
FIG. 5 is a perspective view of FIG. 4 showing two cable routing paths.

The termination panel 13 can be configured to extend along the tray axis 5 such that it divides the termination region 18 into a first side 24 and a second side 26. The first side 24 of the termination region 18 can be adapted to receive incoming distribution cable while the second side 26 of the termination region 18 can be adapted for outgoing cable. In one example, connectorized ends of the pigtails can be optically connected to adapters provided on the termination panel 13. The incoming optical fibers can be configured to bring in signals while the outgoing optical fiber leaves the tray 10 to be one-to-one connected or spliced. In some examples, the outgoing optical fiber can be passed through a splitter or other optical device. For example, incoming distribution fiber pigtails 7 can be routed to the first side 24 and outgoing distribution fiber pigtails 9 can be routed from the second side 26 as shown in FIG. 5. The pigtails from the first and second sides 24, 26 can be separated on the tray 10 to prevent crossover. Details of the separate routing paths for the incoming and outgoing distribution fiber pigtails 7, 9 are described in further detail below.

The tray 10 can include cable management elements 28 for holding incoming cables or fiber tubes inside the tray 10. Elements 28 can include hooks, tabs, ties, and other devices for guiding and managing cables or tubes. In one example, the elements 28 can be positioned along the side walls 16 of the tray 10 and generally extend over the bottom wall 14 to manage optical fiber.

Figure 2:
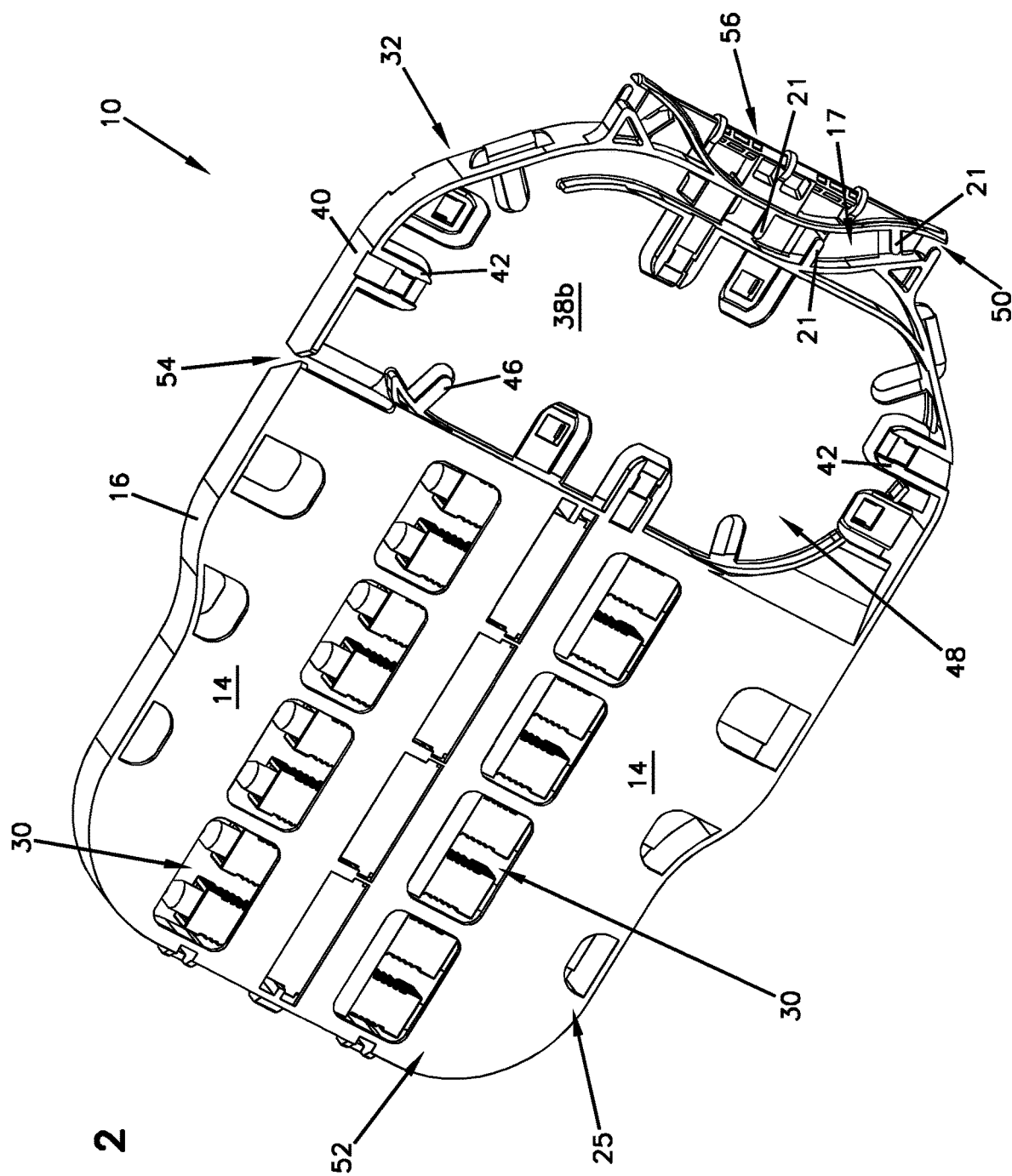
FIG. 2 is a bottom perspective view of FIG. 1.

Referring to FIG. 2, the back side of the tray 10 is depicted. In some examples, the bottom wall 14 of the tray 10 can define a plurality of openings 30. The openings 30 are configured such that multiple adapters can be accessible therethrough. The openings 30 can allow an operator to grasp the connector 20 through the openings 30 without interference with adjacent connectors 20. For example, the openings 30 can permit finger access for handling pigtails for re-patching or adding pigtails. Thus, it is not necessary to have finger access between the adjacent adapters as the operator can handle the connectors on the tray 10 through the openings 30 that allow for quick access for connecting or disconnecting the connectors on the termination panel 13. In one example, the bottom wall 14 of the tray 10 can include four openings 30 on each of the first and second sides 24, 26 of the termination region 18.

In other examples, the tray 10 can include a middle portion 32 (e.g., storage basket). The middle portion 32 can have a first pocket 44 (see FIG. 1) and an opposite second pocket 48 (see FIG. 2). Each of the first and second pockets 44, 48 can respectively include a base 38a, 38b, side portions 40 surrounding the base 38a, 38b, and cable fixation clamps 46 extending generally from the side portions 40. In one example, the side portions 40 can cooperate with the base 38a to form the first pocket 44 (e.g., storage area) for storing slack or loops of cable. The side portions 40 can cooperate with the base 38b to form the second pocket 48 (e.g., storage area) for storing slack or loops of cable.

In one example, the first pocket 44 of the middle portion 32 can communicate with the second side 26 of the termination region 18 of the tray 10. The first pocket 44 can include a dedicated entrance 49 for the outgoing distribution fiber pigtails 9. The outgoing distribution fiber pigtails 9 can be routed from the second side 26 of the termination panel 13 to the first pocket 44 as shown in FIG. 5 and be lead along a first pathway 15. Coils of the slack lengths of the outgoing distribution fiber pigtails 9 can be retained by the cable fixation clamps 46 and guide rings or guide walls 11 (see FIG. 1) within the first pocket 44. In other words, after positioning of the stored cable in the first pocket 44 of the middle portion 32, the cable fixation clamps 46 can hold the stored cable down properly relative to the base 38a. In some examples, the outgoing distribution fiber pigtails 9 positioned at the second side 26 of the termination panel 13 can be outgoing cables directly to the customer. The dedicated entrance 49 and first pathway 15 can help to eliminate crossings of the outgoing distribution fiber pigtails 9 with the incoming distribution fiber pigtails 7 at the first side 24 of the termination panel 13.

The second pocket 48 can be configured as over storage for storing loops of the incoming distribution fiber pigtails 7. After positioning of the stored cable within the second pocket 48, the cable fixation clamps 46 can hold the stored cable down properly relative to the base 38b. The first side 24 of the termination panel 13 can include the incoming distribution fiber pigtails 7 routed from a splitter. In some examples, the incoming distribution fiber pigtails 7 can be configured and routed on the tray 10 while in a factory such that there is no need to manipulate the incoming distribution fiber pigtails 7 from a backside 25 of the tray 10. The second pocket 48 can include an entrance 50 opposite the dedicated entrance 49 for leading the incoming distribution fiber pigtails 7 along second pathway 17 to the second pocket 48 for storing slack or loops of cable. It will be appreciated that the tray 10 may be molded in a mirror image to allow incoming and outgoing cables to be switched to opposite pathways on the tray 10.

The second pocket 48 of the middle portion 32 can communicate with the first side 24 of the termination region 18 of the tray 10. In one example, the second pocket 48 can include a turn over point 54 (e.g., fiber transition opening) to permit cable to be routed therethrough to an opposite side of the tray 10. The turn over point 54 can have an access structure for allowing optical fibers to be inserted into the turn over point 54.

In one example, the incoming distribution fiber pigtails 7 can be routed in the entrance 50 to the second pocket 48 where the incoming distribution fiber pigtails 7 can be looped. In other words, a substantial length of slack cable can be routed to the second pocket 48. In other examples, incoming distribution fiber pigtails 7 can be routed through the turn over point 54 to the first side 24 of the termination panel 13 as shown in FIG. 5.

Referring to FIG. 3, a first cover 60 may be used to cover the middle portion 32 of the tray 10. For example, a first cover 60 may be used to cover the first pocket 44 and a second cover 61 may be used to cover the second pocket 48. The covers 60, 61 can help to retain the pigtails looped therein. In one example, the covers 60, 61 can be used to form a partially enclosed basket area for storage of pigtails. The covers 60, 61 can be secured in the closed position by clamps, latches, straps or any other suitable mechanism, such as, capture arms 42. The covers 60, 61 may be made of a lightweight, structurally flexible material, such as a polymeric material or molded plastic. In some examples, the tray 10 may be made of similar materials as covers 60, 61. An example cover is illustrated and described in more detail with reference to FIG. 8.

In other examples, the tray 10 can include a hinge 56 (see FIGS. 1 and 2) for mounting to a tray tower 58 (e.g., mounting bracket). A part of the hinge 56 is shown in FIG. 1 and the other part in FIG. 3. The hinge 56 has a hinge axis 55 that is perpendicular to the tray axis 5. The tray 10 is adapted to pivot around the hinge axis 55. In one example, the hinge 56 can include pins 57 on the tray 10 and clips 19 (see FIG. 3) on the tray tower 58 for holding the pins 57. In other examples, the pins 57 and clips 19 may be reversed such that the pins 57 are configured on the tray tower 58 and the clips 19 are configured on the tray 10.

The Multiple trays 10 are shown in FIG. 3 attached to the tray tower 58. To attach the trays 10 to the tray tower 58 the pins 57 of the hinge 56 can be snapped into the clips 19 on the tray tower 58. The stacked trays 10 may be assembled in known or other suitable manner. For example, the trays 10 can be pivotally mounted on the tray tower 58 to cantilever therefrom and pivot about the hinge axis 55. In one example, the trays 10 may be staggered vertically as mounted on the tray tower 58. In other examples, the trays 10 may be stacked horizontally.

Referring again to FIG. 3, the tray tower 58 can have a base 63 that defines a passageway 59 along each side of the tray tower 58 for routing cable into and out of the tray tower 58. In certain examples, the passageway 59 may be used for running cable along the sides of the tray tower 58 horizontally to the tray 10. The cable can be routed up the tray tower 58 as shown in FIG. 5 and curved into either the first or second pocket 44, 48 for storing slack or loops of cable and routed to the respective first or second side 24, 26 of the termination region 18. In some examples, cable may be routed into and out of a splice.

Figure 4:
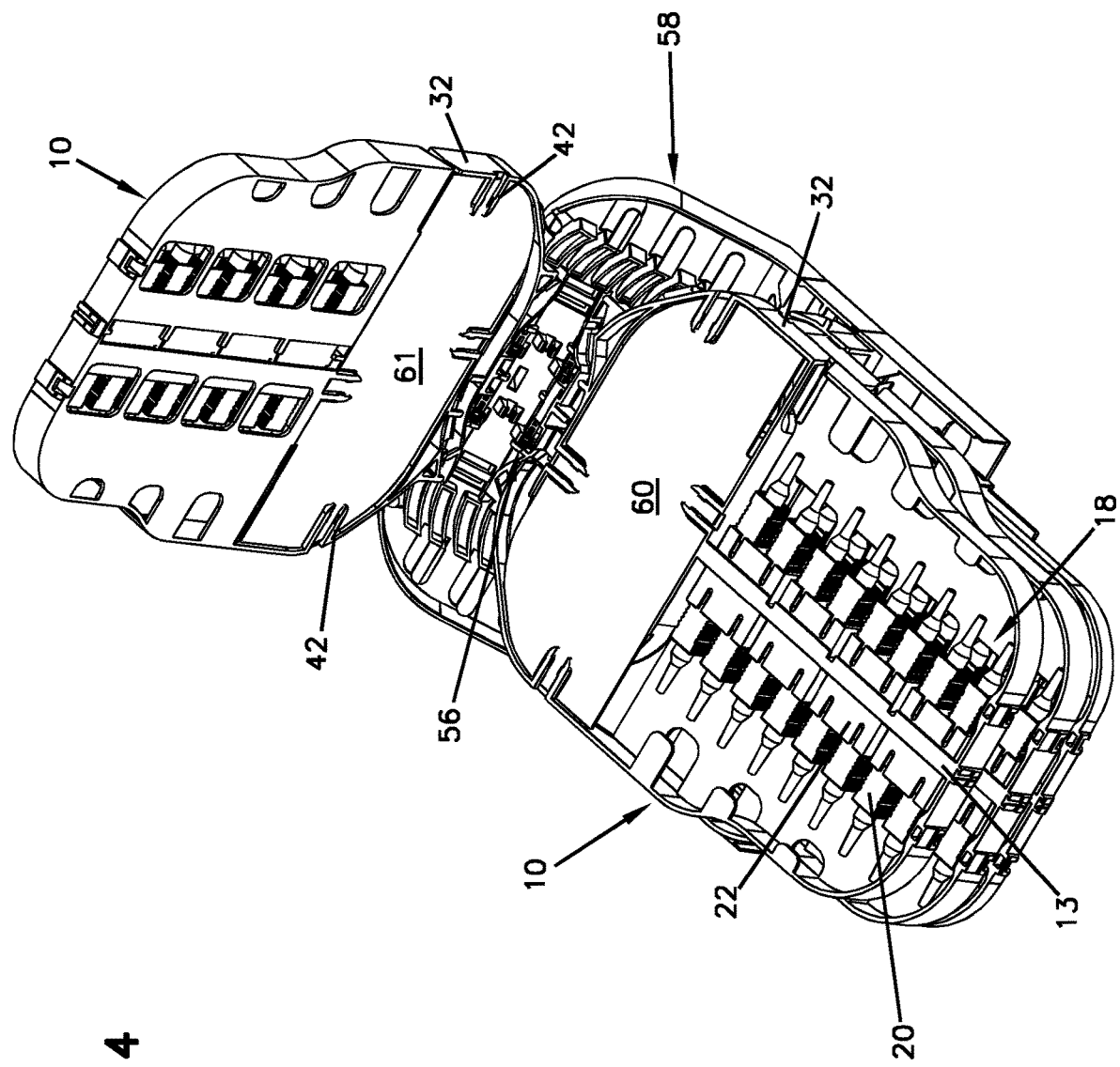
FIG. 4 is a perspective view of FIG. 3 with one of the trays pivoted upward.

Referring to FIG. 4, lower ones of the trays in the stack can be accessed without removal of superposed trays. One end of the stack can be lifted upwardly or pivoted. After work within that tray is completed, it can be returned to its located position in the stack merely by reversing the procedure. In some examples, the middle portion 32 can be located between the hinge 56 of the tray 10 and the termination region 18. In one example, multiple trays may be stacked in groups or blocks that form a stacked arrangement.

A portion of first and second pathways 15, 17 are positioned adjacent to the hinge 56 to avoid potentially damaging cable pull during pivoting movement of trays. Flanges 21 can help maintain cables in the first and second pathways 15, 17. The middle portion 32 includes the first and second pathways 15, 17 that extend to either side of tray 10 to supply cables to the termination panel 13 and each of the first and second pockets 44, 48. Having separate first and second pathways 15, 17 generally allow cables to pass close to the hinge 56 without crossing over to help keep incoming and outgoing cables separate.

Figure 6:
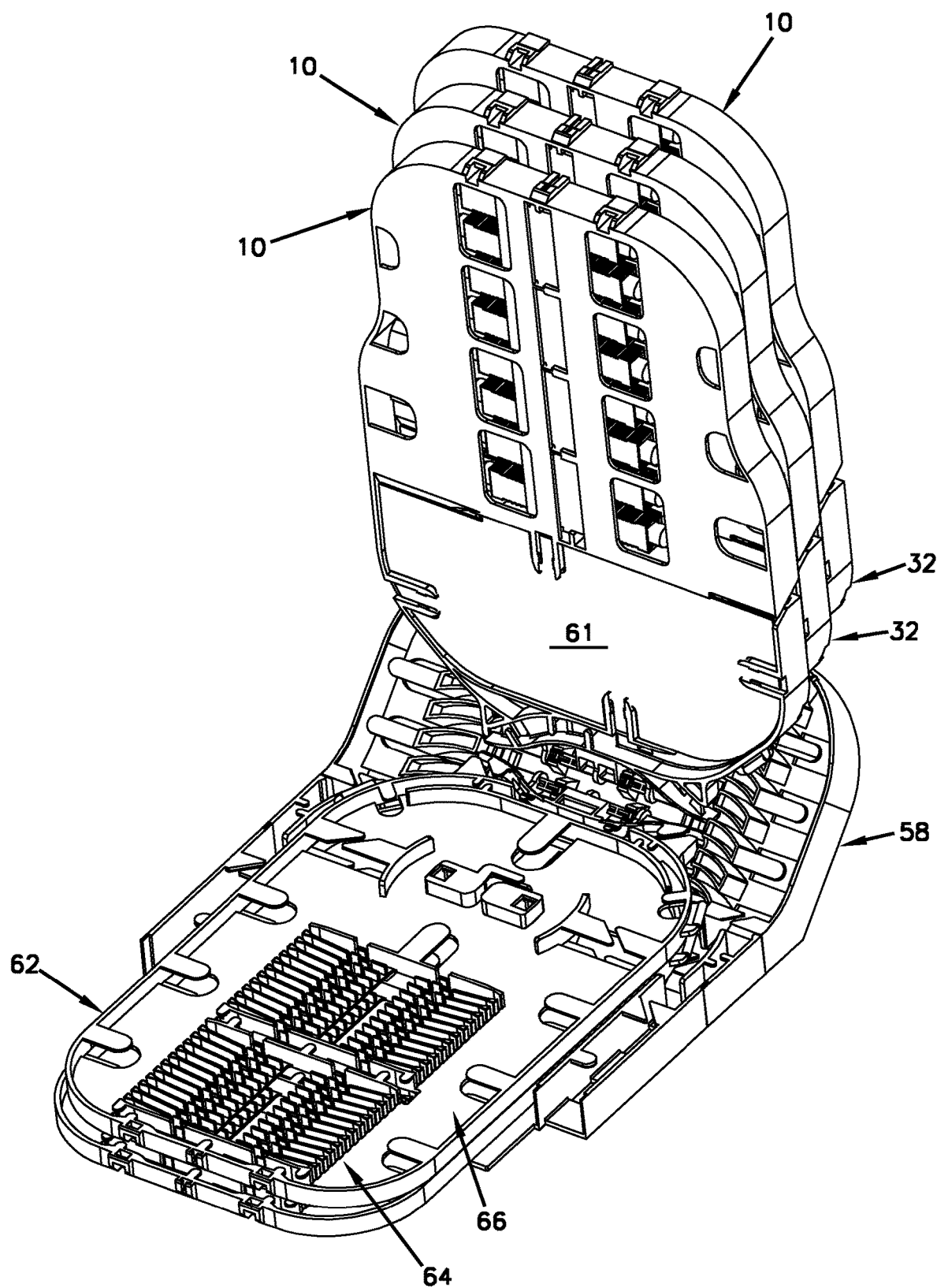
FIG. 6 is a perspective view of FIG. 3 showing a splice tray.

Referring to FIG. 6, an example splice tray 62 is shown. Splice holder mounting locations 64 (e.g., receptacles) are provided for receiving and retaining splice holders used to hold splice sleeves that protect fusion splices between cables and fibers of a through cable. The non-connectorized ends of the pigtails/stub assembly can be spliced to fibers from a main cable at the splice tray. In certain examples, fiber management trays in accordance with the principles of the present disclosure can include structures for mounting optical fiber splices and/or passive optical components on major sides of the trays. In other examples, outputs of optical components can be routed to a topmost side 66 of the splice tray 62 for splicing to cables. Outputs of the optical component can also be spliced to optical fibers for forward feeding and/or back feeding signals through the main fiber optic cable. The splice tray 62 can include fiber routing paths for routing excess fiber in looped configurations that prevent the fibers from being bent beyond their minimum bend radius requirements. Additionally, the splice tray 62 can retain and protect fiber optic components such as passive optical splitters and/or wavelength division multiplexors.

Figure 7:
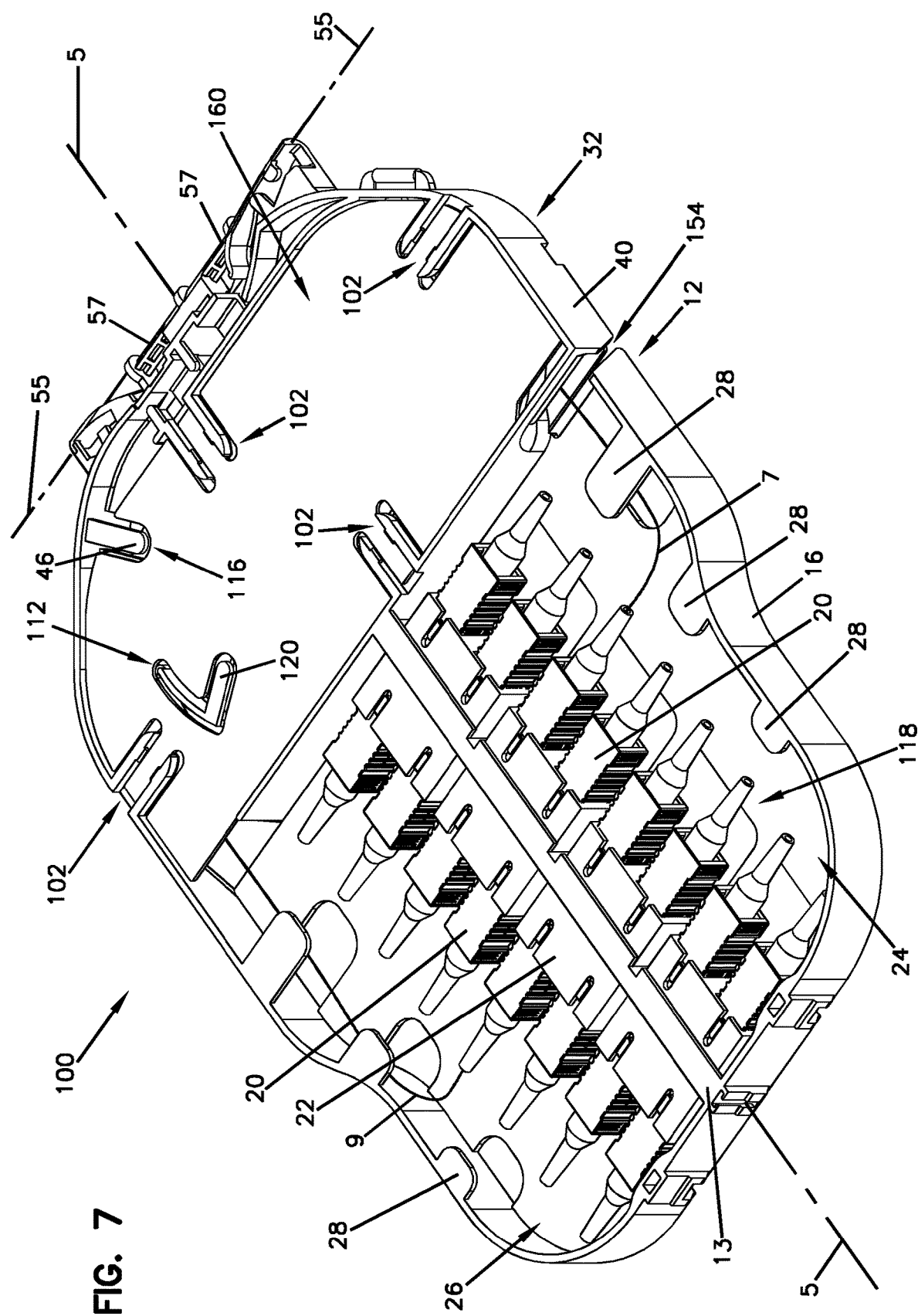
FIG. 7 is a top perspective view another embodiment of a fiber management tray in accordance with the principles of the present disclosure.
Figure 8:
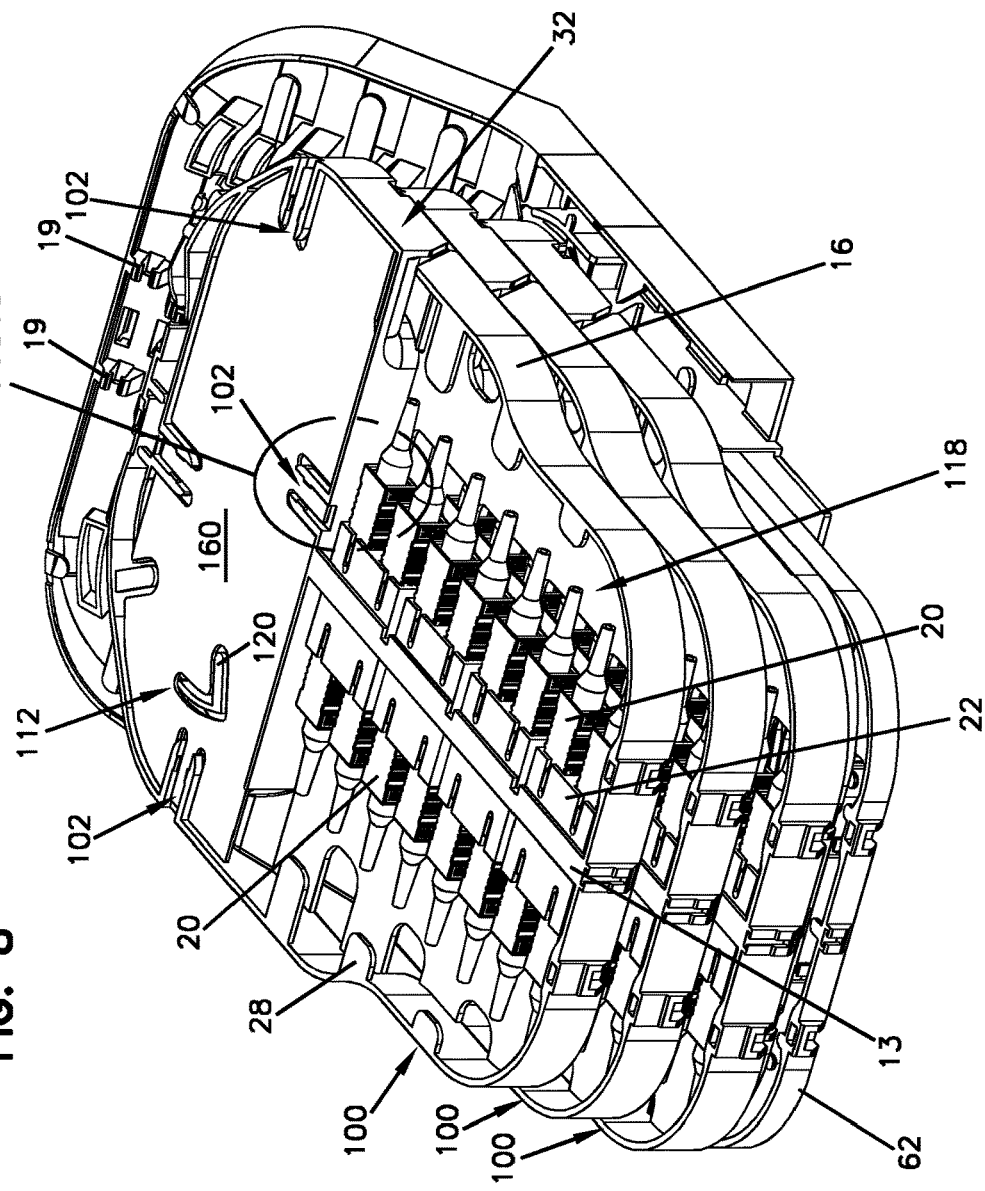
FIG. 8 is a perspective view of FIG. 7 including a plurality of trays.

FIGS. 7-8 show views of an embodiment of another fiber management tray 100. FIGS. 7-8 show the tray 100 having substantially the same features as the embodiment shown in FIGS. 1-6.

The tray 100 includes a cover 160 having a plurality of snap-fit interlocks 102 around a perimeter of the cover 160. The snap-fit interlocks 102 can be used to secure the cover 160 to the tray 100. The cover 160 also defines an aperture 112 configured to receive a portion of a finger 120 formed on the tray 100 to help retain and control cables. The cover 160 further includes a recess 116 for receiving the cable fixation clamp 46 on the tray 100. The snap-fit interlocks 102 are illustrated and described in more detail with reference to FIG. 9.

Figure 9:
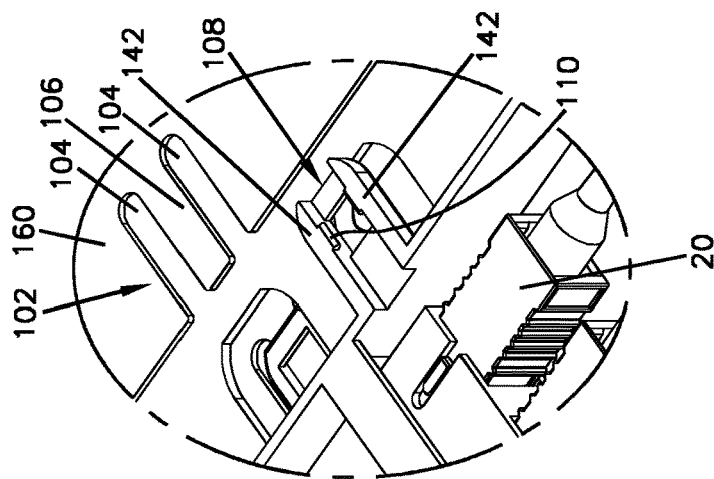
FIG. 9 is an enlarged view of a portion of FIG. 8.

Referring to FIG. 9, an enlarged view of the cover 160 is shown detached from the tray 100. In this example, the snap-fit interlocks 102 on the cover 160 includes slots 104 with a flexible cantilever 106 positioned therebetween. The slots 104 can be configured to receive capture arms 142 on the tray 100. The capture arms 142 can define a receptacle 108. The cover 160 can be snapped into the tray 100 by the snap-fit interlock 102. To initiate the interlock process, the flexible cantilever 106 can be configured to be manually pressed to cause the flexible cantilever 106 to be manually snapped into the receptacle 108. The capture arms 142 can each include a retention feature 110 that extends outwardly into the receptacle 108 to help retain the flexible cantilever 106 therein. The cover 160 can be easily lifted out of the tray 100 by disengaging the flexible cantilever 106 from the receptacle 108.

Figure 10:
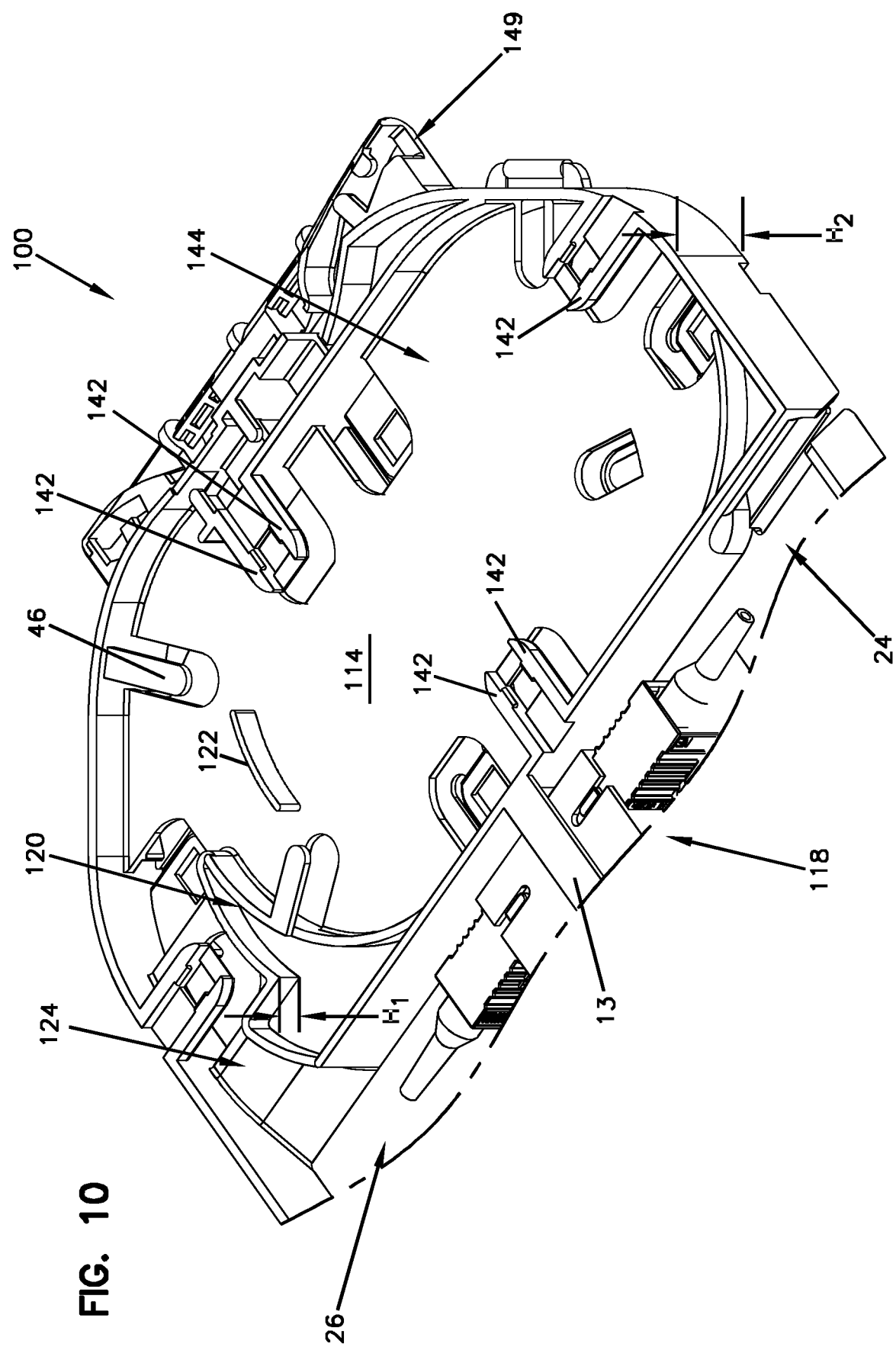
FIG. 10 is a partial view of the tray of FIG. 7.

Referring to FIG. 10, only portions of the tray 100 is shown for purposes of describing details of a first pocket 144. The first pocket 144 has substantially the same features as the first pocket 44 shown in FIG. 1.

The tray 100 provides better organization for multiple loops of each fiber. If multiple loops are required, the tray 100 provides improved management of those cables. The first pocket 144 includes a rib 122 on a bottom wall 114 of the tray 100. The rib 122 helps to organize and retain looped cables within the first pocket 144. In certain examples, the finger 120 can extend upwardly into the first pocket 144 to help control or manage the cable slack or loops in the first pocket 144. The finger 120 has a first height $H_1$ such that it may accommodate as much cable as possible underneath without having to raise a second height $H_2$ of the tray 100. The finger 120 is tall enough such that it can be received within the aperture 112 of the cover 160. It will be appreciated that the heights $H_1$, $H_2$ of the finger 120 and the tray 100 may vary with other embodiments. The finger 120 configuration can create a narrow channel 124 on the tray 100 for feeding cables into the first pocket 144. The narrow channel 124 is separate from the first pocket 144 and helps to manage the cable routed to the second side 26 of the termination region 18.

Figure 11:
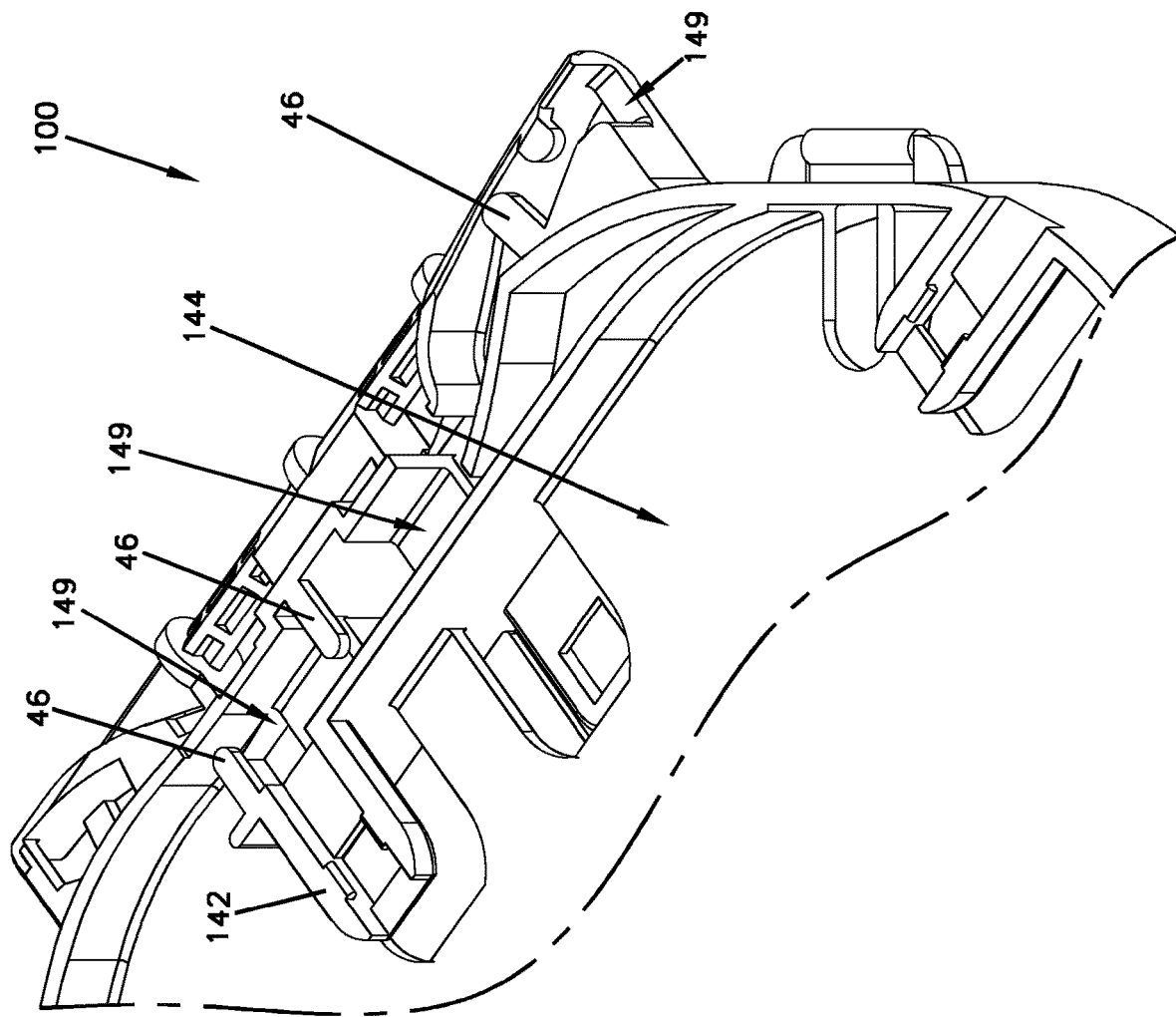
FIG. 11 is an enlarged view of a portion of FIG. 10.

Referring to FIG. 11, an enlarged view of a portion of FIG. 10 is shown to illustrate a dedicated entrance 149 for routing cable into the first pocket 144 of the tray 100. As described above, the cable can be routed into the first pocket 144 through the dedicated entrance 149 where a plurality of cable fixation clamps 46 can be used to help retain the cable. A desired length of cable can be looped within the first pocket 144 and organized by the ribs 122 and cable fixation clamps 46. The finger 120 can help organize the cables while it provides for the narrow channel 124 whereby the cables can be better aligned for entering a termination region 118.

Figure 12:
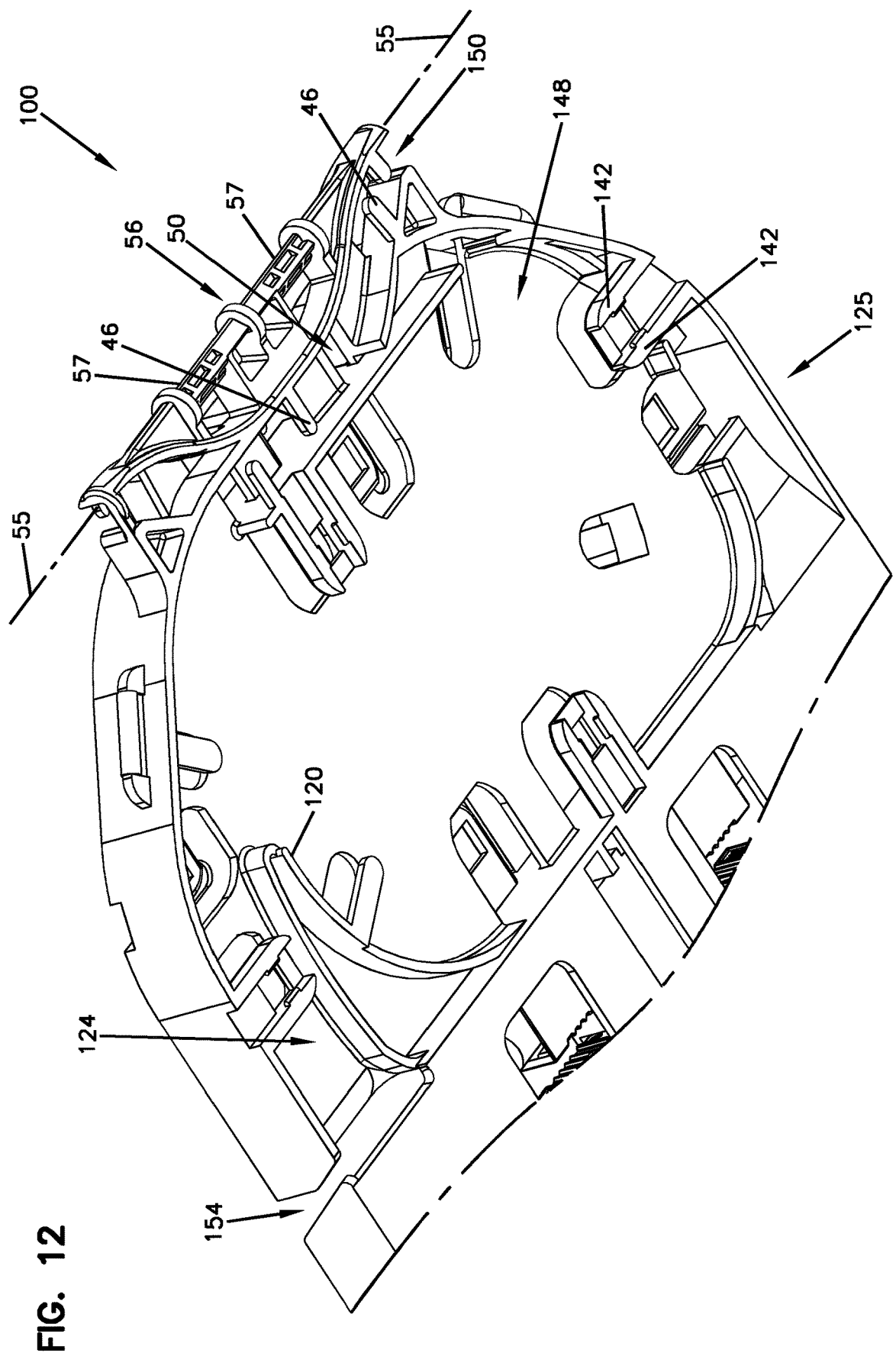
FIG. 12 is a bottom partial view of the tray of FIG. 7.

Referring to FIG. 12, an enlarged view of a backside 125 of the tray 100 is shown. The tray 100 includes a second pocket 148 that has substantially the same features as the second pocket 48 shown in FIG. 2.

Figure 13:
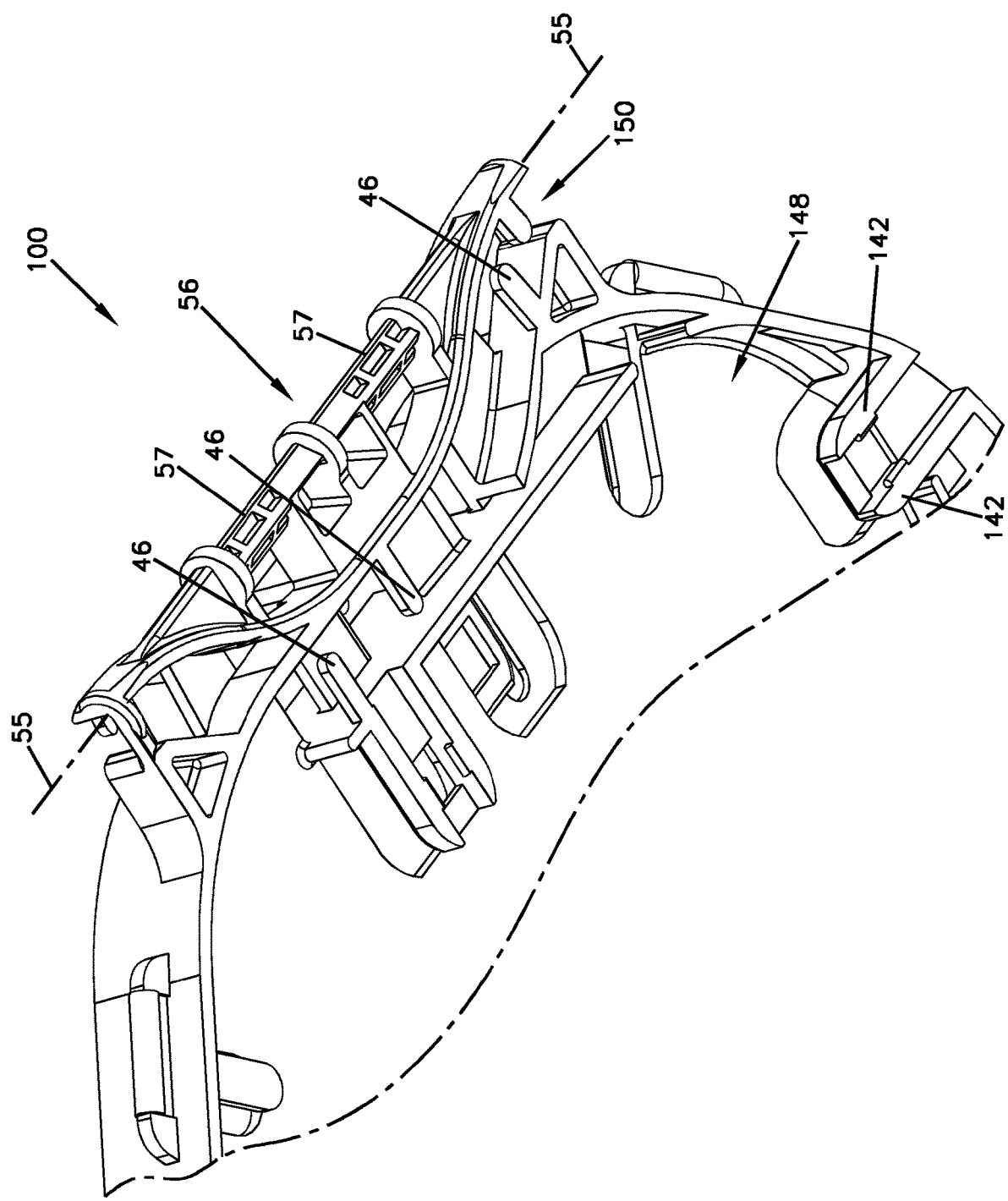
FIG. 13 is an enlarged view of a portion of FIG. 12.

Similarly to the first pocket 144, the second pocket 148 also includes the finger 120 described above. The second pocket 148 has an entrance 150 for cables that is separate from the dedicated entrance 149 of the first pocket 144. FIG. 13 shows an enlarged view of the entrance 150. Similarly to FIG. 5, the slack or loops of cables are routed through the entrance 150 and stored within the second pocket 148. The tray 100 also includes a turn over point 154 for routing cable at the backside 125 of the tray 100 from the second pocket 148 through the narrow channel 124 to the first side 24 of the termination region 118. The routing of the cable is similar to that described above in reference to FIG. 2. It will be appreciated that the tray 100 may be molded in a mirror image to allow incoming and outgoing cables to be switched to opposite pathways on the tray 10.

Figure 14:
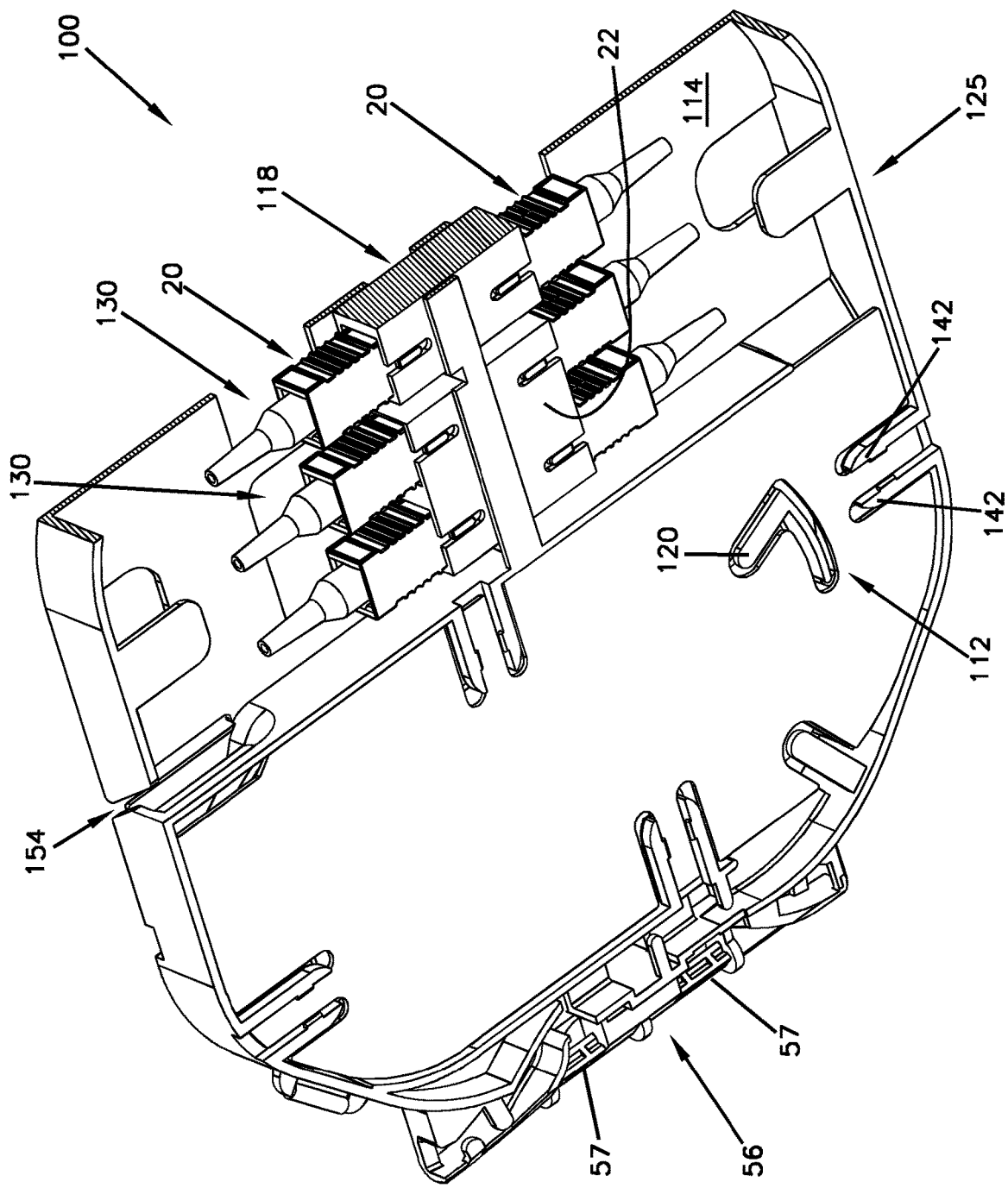
FIG. 14 is a bottom view of the tray of FIG. 7 showing a partial termination region in accordance with principles of the present disclosure.

Referring to FIG. 14, the backside 125 of the tray 100 is depicted. A portion of the termination region 118 is shown detailing the connectors 20. A plurality of openings 130 are defined within the bottom 114 of the tray 100 as described above with reference to FIG. 2. As shown, each of the openings 130 includes two connectors 20. The openings 130 defined in the bottom wall 114 allow an operator to easily take hold of the connectors 20 using just two fingers, for example, from top to bottom. Thus, it is not necessary to take hold of the connectors 20 at adjacent sides. The openings 130 are configured such that an operator can grasp the connectors 20 through the openings 130 without interference with adjacent connectors 20.

Figure 15:
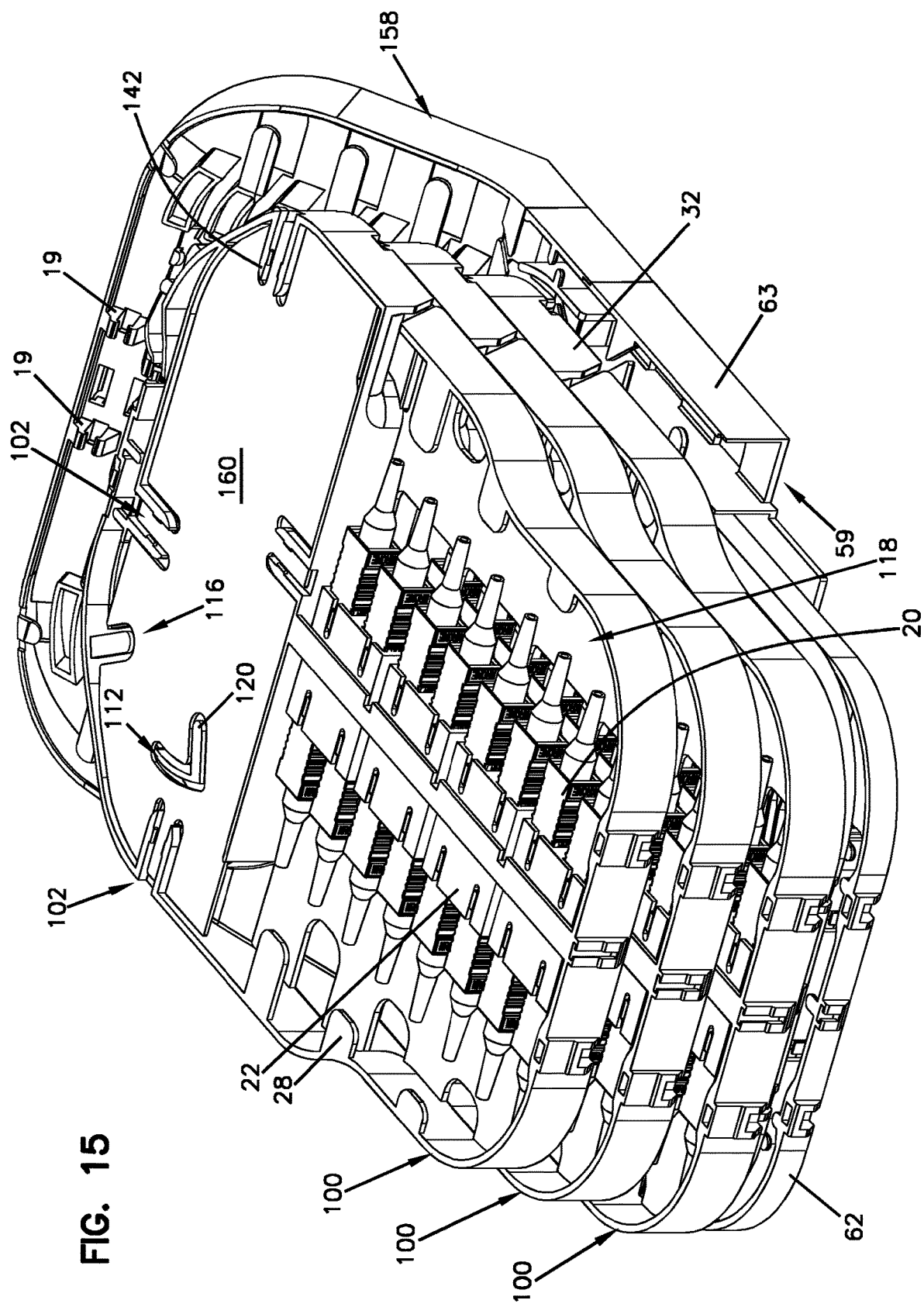
FIG. 15 is a perspective view of FIG. 8.
Figure 16:
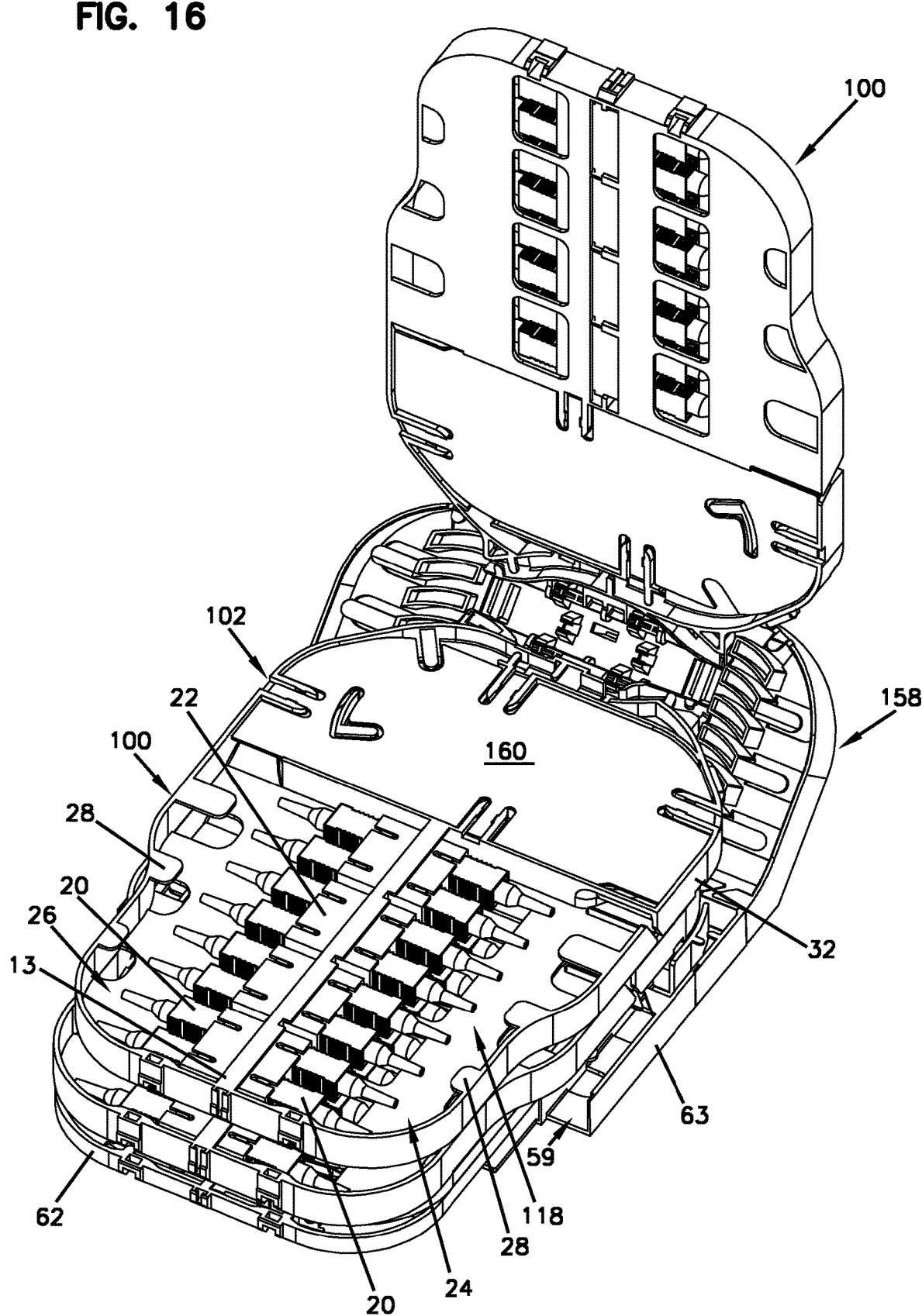
FIG. 16 is a perspective view of FIG. 15 with one of the trays pivoted upward.

FIGS. 15-16 show a stacked configuration of a plurality of the trays on a tray tower 158 in which the trays can pivot thereon as described above. Although three trays are shown, it will be appreciated that any number of trays may be mounted on the tray tower 158. Features of the pivoting trays 100 and the tray tower 158 are similar to FIGS. 3-6 described above.

From the forgoing detailed description, it will be evident that modifications and variations can be made without departing from the spirit and scope of the disclosure.

LIST OF REFERENCE NUMERALS AND CORRESPONDING FEATURES

5—Tray axis
7—Incoming distribution fiber pigtails
9—Outgoing distribution fiber pigtails
10—Fiber management tray
11—Guide rings
12—Body
13—Termination panel
14—Flat bottom wall
15—First pathway
16—Opposing side walls
17—Second pathway
18—Termination region
19—Clips
20—Connectors
21—Flanges
22—Adapter blocks
24—First side
25—Backside
26—Second side
28—Cable management elements
30—A plurality of openings
32—Middle portion
38a, —Base
38b—Base
40—Side portions
42—Capture arms
44—First pocket
46—Cable fixation clamps
48—Second pocket
49—Dedicated entrance
50—Entrance
54—Turn over point
55—Hinge axis
56—Hinge
57—Pins
58—Tray tower
59—Passageway
60—First cover
61—Second cover
62—Splice tray
63—Base
64—Splice holder mounting locations
66—Topmost side
100—Fiber management tray
102—Snap-fit interlocks
104—Slots
106—Flexible cantilever
108—Receptacle
110—Retention feature
112—Aperture
114—Bottom wall
116—Recess
118—Termination region
120—Finger
122—Rib
124—Narrow channel
125—Backside
130—Openings
142—Capture arms
144—First pocket
148—Second pocket
149—Dedicated entrance
150—Entrance
154—Turn over point
158—Tray tower
160—Cover
$H_1$—First height
$H_2$—Second height

What is claimed is:

1. A fiber management tray having a body comprising:
a bottom wall, said bottom wall including side walls extending outwardly from said bottom wall, said fiber management tray having a tray axis;
a termination region having a first side and a second side, said termination region including a termination panel that holds connectors, said termination region extending along said tray axis;
a hinge area for mounting said fiber management tray to a tray tower, said hinge area having a hinge axis perpendicular to said tray axis;
a storage basket located between said termination region and said hinge area, said storage basket including a first pocket positioned on a front side of the fiber management tray, wherein the first pocket communicates with said second side of said termination region and an opposite second pocket positioned on a back side of the fiber management tray, wherein the second pocket communicates with said first side of said termination region, the fiber management tray defining a first fiber routing path having a first entrance adjacent and parallel to said hinge axis, said first fiber routing path leading to said first pocket, said fiber management tray also defining a second fiber routing path having a second entrance adjacent and parallel to said hinge axis, said second fiber routing path leading to said second pocket, wherein said first and second fiber routing paths do not overlap;

a first cover attachable to said fiber management tray to cover said first pocket;

a second cover attachable to said fiber management tray to cover said second pocket; and a fiber transition opening including a slit defined in a side wall of said second pocket, said fiber transition opening allowing optical fibers to be inserted therethrough for transitioning said optical fibers between said back side of said fiber management tray to said front side of said fiber management tray, wherein optical fibers are transitioned from said second pocket of said storage basket through said fiber transition opening to said first side of said termination region;

wherein said storage basket includes fiber guide walls that define fiber routing paths, said fiber guide walls projecting downwardly from said second pocket and upwardly from said first pocket;

wherein said first pocket of said storage basket forms a first storage area for storing loops of cable; and wherein said second pocket of said storage basket forms a second storage area for storing loops of cable.

2. The fiber management tray of claim 1, wherein a splice tray is adapted to be attached to the tray tower.

3. The fiber management tray of claim 2, further comprising splice holder mounting locations on said splice tray.

4. The fiber management tray of claim 1, further comprising a plurality of separate fiber management trays.

5. The fiber management tray of claim 1, wherein said first pocket can be configured for storing loops of outgoing distribution fiber pigtails.

6. The fiber management tray of claim 1, wherein said second pocket can be configured for storing loops of incoming distribution fiber pigtails.

7. The fiber management tray of claim 1, wherein said first and second pockets of said storage basket separates incoming and outgoing fiber pigtails to prevent crossover.

8. The fiber management tray of claim 1, wherein said first cover is adapted to cover fiber pigtails stored within said first pocket.

9. The fiber management tray of claim 1, wherein said second cover is adapted to cover fiber pigtails stored within said second pocket.

10. The fiber management tray of claim 1, wherein the bottom wall includes a plurality of openings that provide access for handling said fiber management connectors.

11. The fiber management tray of claim 10, wherein at least two of said connectors are accessible through each of said openings.

12. The fiber management tray of claim 11, wherein said connectors are handled through said openings without interference with adjacent connectors.

13. The fiber management tray of claim 12, wherein said connectors are pulled apart from said termination panel through said openings.

14. The fiber management tray of claim 8, further comprising a finger that extends upwardly into said first pocket to control or manage slack or loops of cable.

15. The fiber management tray of claim 14, wherein said finger defines a separate narrow passageway that feeds into said first pocket.

16. The fiber management tray of claim 15, wherein said first cover defines an aperture configured to receive a portion of said finger.

17. A fiber management tray having a body comprising:

a bottom wall, said bottom wall defining a plurality of openings for handling connectors, wherein at least two connectors are accessible through each of said openings, said fiber management tray having a tray axis;

a termination region having a first side and a second side, said termination region including a termination panel that holds said connectors, said connectors being pulled apart from said termination panel through said openings, said termination region extending along said tray axis;

a hinge area for mounting said fiber management tray to a tray tower, said hinge area having a hinge axis perpendicular to said tray axis;

a storage basket located between said termination region and said hinge area, said storage basket including a first pocket positioned on a front side of said fiber management tray, wherein said first pocket communicates with said second side of said termination region and an opposite second pocket positioned on a back side of said fiber management tray, wherein said second pocket communicates with said first side of said termination region, said fiber management tray defining a first fiber routing path leading to said first pocket and a second fiber routing path leading to said second pocket, said first fiber routing path having a first entrance adjacent and parallel to said hinge axis, and said second fiber routing path having a second entrance adjacent and parallel to said hinge axis, wherein said first and second routing paths do not overlap;

a first cover attachable to said fiber management tray to cover fiber pigtails stored within said first pocket; and a second cover attachable to said fiber management tray to cover fiber pigtails stored within said second pocket;

wherein said fiber management tray defines a fiber transition opening including a slit defined in a side wall of said second pocket for transitioning optical fibers between said second pocket on said back side of said fiber management tray and said first side of said termination region on said front side of said fiber management tray, said fiber transition opening having an access structure for allowing optical fibers to be inserted into said fiber transition opening; and wherein said storage basket includes fiber guide walls that define said fiber routing paths, said fiber guide walls projecting downwardly from said second pocket and upwardly from said first pocket.

* * * * *